United States Patent [19]

Shay

[11] Patent Number: 4,573,252

[45] Date of Patent: Mar. 4, 1986

[54] METHOD OF INSTALLING STEERING WHEEL LOCK PLATE ON A STEERING WHEEL SHAFT

[76] Inventor: Robert W. Shay, 501 SW. 2nd St., Hallandale, Fla. 33009

[21] Appl. No.: 673,050

[22] Filed: Nov. 19, 1984

[51] Int. Cl.[4] .............................................. B23P 11/02

[52] U.S. Cl. ........................................ 29/453; 29/229; 29/235; 29/263; 29/256; 29/526 R; 74/492

[58] Field of Search ..................... 29/450, 453, 526 R, 29/283, 229, 235, 256, 263, 228; 74/492

[56] References Cited

U.S. PATENT DOCUMENTS

| | | | |
|---|---|---|---|
| 1,069,539 | 8/1913 | Evans, Jr. | 29/229 UX |
| 3,030,700 | 4/1962 | Jensen | 29/229 |
| 3,050,840 | 8/1962 | Dunkerley | 29/263 |
| 3,116,362 | 12/1963 | Rankin | 29/453 UX |
| 3,263,318 | 8/1966 | Merrill | 29/235 X |
| 3,358,352 | 12/1967 | Wilcox | 29/263 |
| 3,386,154 | 6/1968 | Thill | 29/256 X |
| 3,827,710 | 8/1974 | Connell et al. | 74/492 X |
| 3,949,459 | 4/1976 | Marenchin | 29/235 X |
| 4,054,986 | 10/1977 | Marres et al. | 29/229 X |
| 4,183,268 | 1/1980 | Anderson | 29/228 |

*Primary Examiner*—Charlie T. Moon

*Attorney, Agent, or Firm*—Harvey B. Jacobson

[57] ABSTRACT

An open ended cylindrical sleeve is provided including a washer secured over one axial end of the sleeve in any convenient manner such as by welding and the washer is of an outside diameter greater than the outside diameter of the sleeve and of an inside diameter less than the inside diameter of the sleeve.

2 Claims, 3 Drawing Figures

METHOD OF INSTALLING STEERING WHEEL LOCK PLATE ON A STEERING WHEEL SHAFT

BACKGROUND OF THE INVENTION

1. Field of the Invention

The installation tool of the instant invention is related generally to the metal working field and more specifically to the assembly of component parts through the utilization of a circular retaining spring. Further, the invention involves the provision of a tubular work engaging tool for simultaneously axially shifting two parts to be assembled relative to each other as well as a locking ring whose function is to maintain the two parts in assembled relation.

2. Description of Related Art

Various different forms of tools for the assembly and disassembly of a plurality of parts heretofore have been provided such as those disclosed in U.S. Pat. Nos. 1,465,124, 1,521,202, 3,305,921, 3,791,006 and 3,995,360. However, these previously known forms of tools are not capable of performing the intended function of the instant invention in the improved manner accomplished thereby.

SUMMARY OF THE INVENTION

The installation tool of the instant invention comprises a cylindrical body member open at its opposite ends and having an annular abutment washer secured to one axial end of the body member in any convenient manner such as by welding. The abutment washer is of an outside diameter greater than the outside diameter of the body member and the inner periphery of the annular washer is of a diameter less than the inside diameter of the body member.

The main object of this invention is to provide a tool by which a steering column locking plate and retaining ring therefor may be simultaeously axially displaced along a vehicle steering wheel shaft into full assemblied relation therewith and with the spring seated within a spring retaining groove formed in the steering wheel shaft.

Another object of this invention is to provide an installation tool enabling the steering column locking plate and retaining ring therefore to be readily installed by a single workman.

Still another important object of this invention is to provide an improved method of installing the steering column locking plate and its retaining ring upon an associated vehicle steering wheel shaft.

A further object of this invention is to provide an installation tool in accordance with the preceding objects and which will require substantially no training in the use thereof.

A final object of the instant invention to be specifically enumerated herein is to provide an installation tool in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference behind had to the accompanying drawings forming a part hereof, wherein like numerals refer to like parts throughout.

DESCRIPTION OF THE PREFERRED EMBODIMENT

Figure 1:
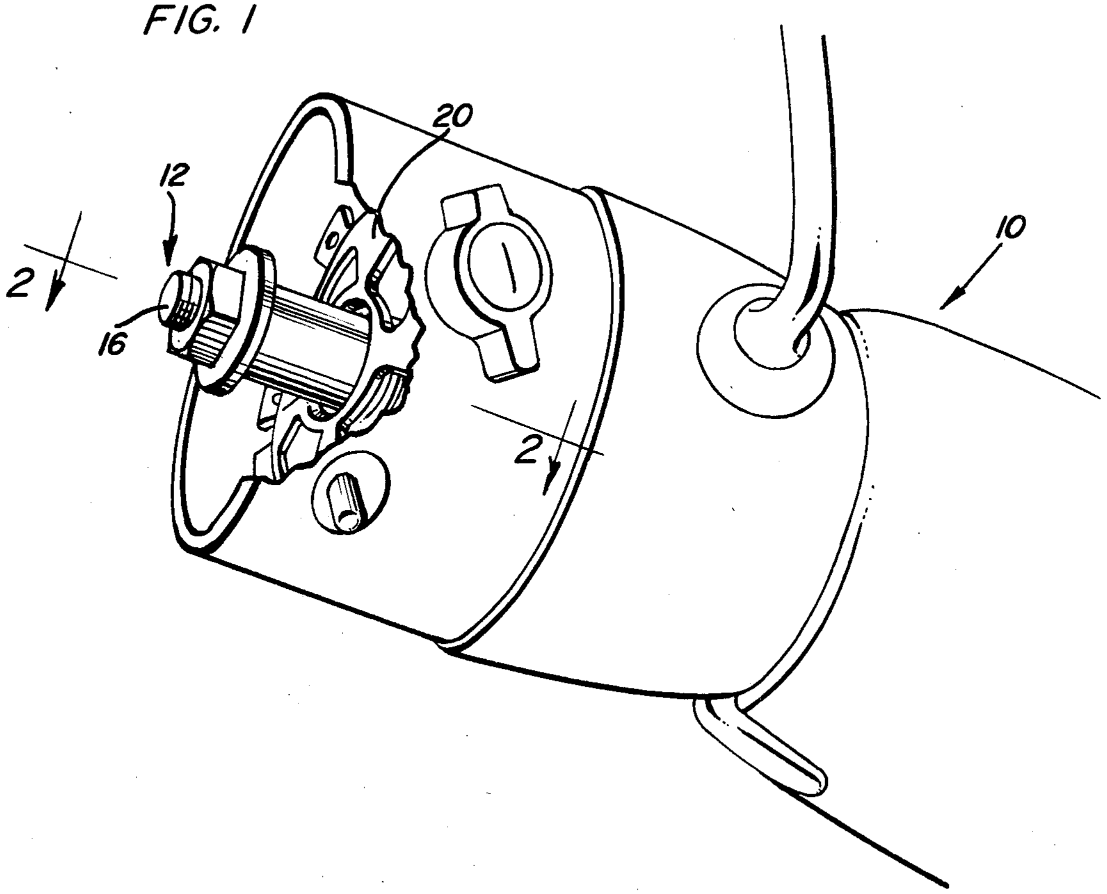
FIG. 1 is a fragmentary perspective view of the upper portion of a conventional form of vehicle steering column with the steering wheel removed and the tool of the instant invention in use in installing the steering column locking plate and associated retaining ring on the vehicle steering wheel shaft.
Figure 2:
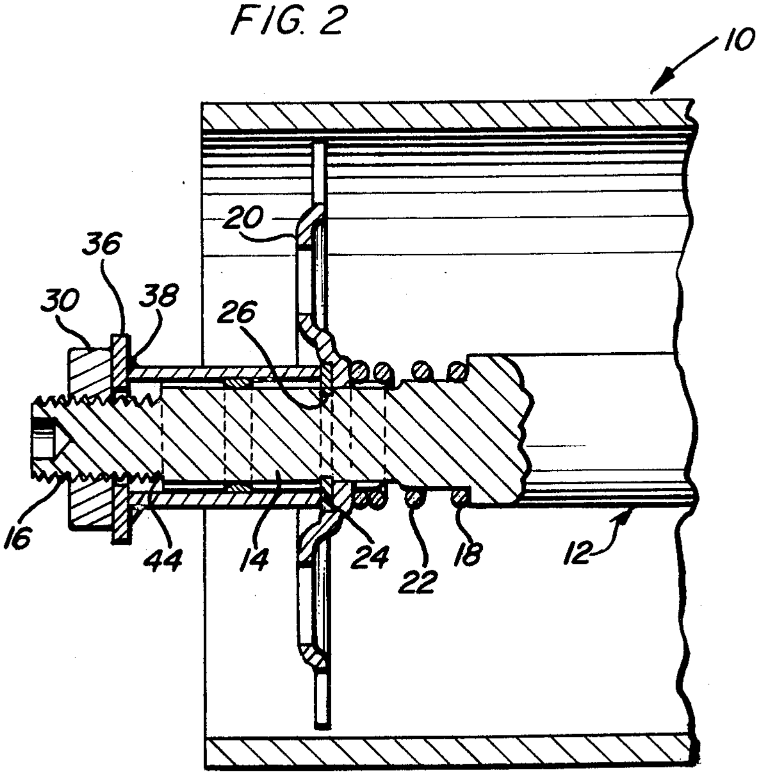
FIG. 2 is an enlarged fragmentary sectional view taken substantially upon the plane indicated by the section line 2—2 of FIG. 1.
Figure 3:
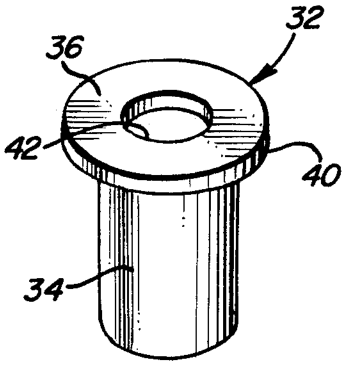
FIG. 3 is an enlarged perspective view of the tool.

Referring now more specifically to the drawings, the numeral 10 generally designates a conventional form of vehicle steering column downwardly through which a journalled steering wheel shaft 12 extends. The upper end of the shaft 12 includes a first diametrically reduced and externally splined end portion 14 and an upper externally threaded and further diametrically reduced terminal end 16. The shaft 12 also defines a shoulder 18 at the lower limit of the end portion 14 and facing upwardly toward the terminal end 16.

Conventionally, an internally splined steering wheel locking plate 20 is mounted on the end portion 14 above a cylindrically coiled compression spring 22 abutted against the shoulder 18 and a locking ring 24 is slightly expanded and slid downwardly over the splined end portion 14 against the locking plate, the spring 22 being compressed and the locking ring 24 being snap engaged in a circumferential groove 26 formed in the end portion 14.

The vehicle steering wheel (not shown) includes a splined hub which is telescoped downwardly over the end portion 14 and secured thereon by a nut 30 threaded on the terminal end 16.

When it is desired to work on the steering column 10 or to change the associated turn signal switch (not shown), it is necessary to remove the steering wheel and to thereafter remove the locking ring 24 and the steering wheel locking plate 20. When thereafter desiring to reassemble the removed components, it is very difficult for a single person to apply sufficient downward force on the locking plate 20 to expose the groove 26 thereabove and to slide the locking ring 24 into seated positions within the groove 26. Accordingly, the installation tool 32 of the instant invention was designed to enable a single person to readily assembly the steering wheel shaft 12, spring 18, locking plate 20 and locking ring 24.

The tool 32 includes an open ended, cylindrical sleeve or body 24 having an annular washer or abutment plate 36 secured by welding 38 to one end portion of the body 34. The washer 36 includes an outer periphery 40 which is larger in diameter than the outside diameter of the body 34 and an inner periphery 42 which is of smaller diameter than the inside diameter of the body 34.

When it is desired to assemble the shaft 12, spring 22, locking plate 20 and lock ring 24, the spring 22 is initially downwardly telescoped over the end portion 14 and abutted against the shoulder 18. Then, the locking plate 20 is slidingly engaged over the end portion 14 and abutted against the upper end of the spring 22, which upper end is spaced above the groove 26 when the spring 22 is in the static state. Then, the locking ring 24 is slightly expanded and slipped downward over the end portion 14. The tool 32 is then telescoped downwardly over the end portion 14 with the end of the body 34 remote from the washer 36 engaged with the lock ring 24. The steering wheel retaining nut 30 is then threaded downwardly along the terminal end portion 16 into abutted engagement with the washer 36.

Continued downward threading of the nut 30 on the terminal end 16 will cause the tool 32 to be shifted downwardly along the end portion 14 and the lower end of the body 34 abutted against the locking ring 24 will thus downwardly shift the latter, and the locking plate 20 with which the ring 24 is engaged, along the shaft 12 until the ring 24 registers with the groove 26 and seats therein. At this point, the locking ring 24 will prevent upward movement of the locking plate 20 and the nut 30 and tool 32 may be removed from the upper end of the shaft 12. Subsequently, the steering wheel (not shown) may be installed on the shaft 12 above the locking plate 20 and retained thereon by the nut 30.

It will be noted that the inner periphery 42 of the washer 36 is of a smaller diameter than the inside diameter of the body 34 and that the inner surface of the inner peripheral portion of the washer 36 is abuttingly engageable with the shoulder 44 defined on the shaft 12 at the lower extremity of the terminal end 16. If for any reason, the lock ring 24 does not seat in the groove 26 and the tool 32 is used to shift the locking plate 20 and the ring 24 downwardly below the groove 26, abutting engagement of the shoulder 44 with the inner peripheral portion of the washer 36 will prevent the coils of the spring 22 from being excessively collapsed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. The method of installing a steering wheel lock plate on a steering wheel shaft of the type including: (1) a splined upper end portion spaced above an upwardly facing annular shoulder on said shaft, (2) a circumferential groove formed in said splined upper end portion, (3) a cylindrical coiled compression spring disposed on said shaft above and downwardly abutted against said shoulder and extending upwardly along said shaft in a static condition to a point spaced above said groove, (4) an internally splined steering wheel locking plate slidingly disposed and meshed with said splines on said upper end portion above said spring and downwardly abutted thereagainst, (5) a snap ring disposed on said upper end portion above said plate and downwardly abutted against the inner periphery thereof, and (6) a diametrically reduced externally threaded upper terminal end, said method comprising the step of telescoping an open ended sleeve downwardly over and along said splined upper end portion with said sleeve having an inside diameter less than the outside diameter of said ring and being downwardly abutted against said ring, and downwardly displacing said sleeve further along said upper end portion so as to downwardly displace said lock ring and plate along said upper end portion while compressing said spring against said shoulder to a position with said lock ring registered with and snapped into said groove.

2. The method of claim 1 wherein the step of downwardly displacing said sleeve along said upper end portion includes the step of threadedly engaging a nut on said diametrically reduced externally threaded upper terminal end portion and threading said nut downwardly therealong against the upper end of said sleeve to thereby displace said sleeve, ring and plate downwardly along said upper end portion.

* * * * *